(12) United States Patent
Gill et al.

(10) Patent No.: US 6,480,365 B1
(45) Date of Patent: Nov. 12, 2002

(54) SPIN VALVE TRANSISTOR USING A MAGNETIC TUNNEL JUNCTION

(75) Inventors: Hardayal (Harry) Singh Gill, Portola Valley, CA (US); Douwe Johannes Monsma, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,543

(22) Filed: Dec. 9, 1999

(51) Int. Cl.⁷ .............................................. G11B 5/127
(52) U.S. Cl. ................................................ 360/324.11
(58) Field of Search ............................. 360/324, 324.1, 360/324.11, 324.12, 317; 324/252

(56) References Cited

U.S. PATENT DOCUMENTS

| | | | |
|---|---|---|---|
| 5,206,590 A | 4/1993 | Dieny et al. | 324/252 |
| 5,521,500 A * | 5/1996 | Schuhl et al. | 324/252 |
| 5,587,943 A * | 12/1996 | Torok et al. | 365/158 |
| 5,650,958 A | 7/1997 | Gallagher et al. | 365/173 |
| 5,668,688 A * | 9/1997 | Dykes et al. | |
| 5,720,410 A | 2/1998 | Umiker | 220/4.26 |
| 5,731,937 A * | 3/1998 | Yuan | 360/324.11 |
| 5,956,215 A * | 9/1999 | Schmalhorst et al. | |
| 6,165,287 A * | 12/2000 | Sato et al. | 148/276 |
| 6,178,066 B1 * | 1/2001 | Barr | 360/126 |
| 6,249,406 B1 * | 6/2001 | Gill et al. | 360/324.11 |

FOREIGN PATENT DOCUMENTS

WO    WO96/07208    3/1996

OTHER PUBLICATIONS

D.J. Monsma et al., "Perpendicular Hot Electron Spin–Valve Effect In A New Magnetic field Sensor: The Spin Valve Transistor", The American Physical Society, vol. 74, No. 26, Jun. 26, 1995, pp. 5260–5263.

D.J. Monsma et al., "Room Temperature–Operating Spin–Valve Transistors Formed by Vacuum Bonding", Science, vol. 281, Jul. 17, 1998, pp. 407–409.

J.D. Boeck, "Switching With Hot Spins", Science, vol. 281, Jul. 17, 1998, pp. 357–359.

K. Mizushima, "Strong Increase of the Effective Polarization of The Tunnel Current in $Fe/AlO_x/Al$ Junctions With Decreasing Fe Layer Thickness", The American Physical Society, vol. 58, No. 8, Aug. 15, 1998, pp. 4660–4663.

K. Mizushima, "Energy–Dependent Hot Electron Transport Across A Spin–Valve", IEEE, vol. 33, No. 5, Sep. 1997, pp. 3500–3504.

D.J. Monsma, "The Spin Valve Transistor", pp. 28–32, 72–74, 85–86.

* cited by examiner

*Primary Examiner*—Allen Cao
(74) *Attorney, Agent, or Firm*—William D. Gill

(57) ABSTRACT

A spin valve transistor sensor is provided having a emitter element, a collector element and a common base element. The negatively biased emitter element injects a spin polarized hot electron current into the base element by tunneling from a ferromagnetic pinned layer to a ferromagnetic free layer through a first tunnel barrier layer. The positively biased collector element, comprising a second tunnel barrier layer and a nonmagnetic metal layer, collects the fraction of the hot electron current that passes through the base element and over the barrier height of the second tunnel barrier layer. The hot electron current is strongly spin polarized and due to the GMR effect in the magnetic tunnel junction element, the magnitude of the base-collector current is strongly dependent on external magnetic (signal) fields. A process is provided for fabrication of a spin valve transistor sensor suitable for high density magnetic recording applications.

23 Claims, 11 Drawing Sheets

SPIN VALVE TRANSISTOR USING A MAGNETIC TUNNEL JUNCTION

BACKGROUND OF THE INVENTION

1. Field of the Invention

This invention relates in general to spin valve transistors for reading information signals from a magnetic medium and, in particular, to a spin valve transistor sensor using a magnetic tunnel junction device for improving magnetoresistive coefficient, and to magnetic storage systems which incorporate such sensors.

2. Description of the Related Art

Computers often include auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive (MR) read sensors, commonly referred to as MR sensors, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flowing through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using only two layers of ferromagnetic material (e.g., Ni—Fe) separated by a layer of non-magnetic material (e.g., copper) are generally referred to as spin valve (SV) sensors manifesting the SV effect.

FIG. 1 shows a prior art SV sensor 100 comprising end regions 104 and 106 separated by a central region 102. A first ferromagnetic layer, referred to as a pinned layer 120, has its magnetization typically fixed (pinned) by exchange coupling with an antiferromagnetic (AFM) layer 125. The magnetization of a second ferromagnetic layer, referred to as a free layer 110, is not fixed and is free to rotate in response to the magnetic field from the recorded magnetic medium (the signal field). The free layer 110 is separated from the pinned layer 120 by a non-magnetic, electrically conducting spacer layer 115. Hard bias layers 130 and 135 formed in the end regions 104 and 106, respectively, provide longitudinal bias for the free layer 110. Leads 140 and 145 formed on hard bias layers 130 and 135, respectively, provide electrical connections for sensing the resistance of SV sensor 100. IBM's U.S. Pat. No. 5,206,590 granted to Dieny et al., incorporated herein by reference, discloses a GMR sensor operating on the basis of the SV effect.

Another type of magnetic device currently under development is a magnetic tunnel junction (MTJ) device. The MTJ device has potential applications as a memory cell and as a magnetic field sensor. The MTJ device comprises two ferromagnetic layers separated by a thin, electrically insulating, tunnel barrier layer. The tunnel barrier layer is sufficiently thin that quantum-mechanical tunneling of charge carriers occurs between the ferromagnetic layers. The tunneling process is electron spin dependent, which means that the tunneling current across the junction depends on the spin-dependent electronic properties of the ferromagnetic materials and is a function of the relative orientation of the magnetic moments, or magnetization directions, of the two ferromagnetic layers. In the MTJ sensor, one ferromagnetic layer has its magnetic moment fixed, or pinned, and the other ferromagnetic layer has its magnetic moment free to rotate in response to an external magnetic field from the recording medium (the signal field). When an electric potential is applied between the two ferromagnetic layers, the sensor resistance is a function of the tunneling current across the insulating layer between the ferromagnetic layers. Since the tunneling current that flows perpendicularly through the tunnel barrier layer depends on the relative magnetization directions of the two ferromagnetic layers, recorded data can be read from a magnetic medium because the signal field causes a change of direction of magnetization of the free layer, which in turn causes a change in resistance of the MTJ sensor and a corresponding change in the sensed current or voltage. IBM's U.S. Pat. No. 5,650,958 granted to Gallagher et al., incorporated in its entirety herein by reference, discloses an MTJ sensor operating on the basis of the magnetic tunnel junction effect.

FIG. 2 shows a prior art MTJ sensor 200 comprising a first electrode 204, a second electrode 202, and a tunnel barrier layer 215. The first electrode 204 comprises a pinned layer (pinned ferromagnetic layer) 220, an antiferromagnetic (AFM) layer 230, and a seed layer 240. The magnetization of the pinned layer 220 is fixed through exchange coupling with the AFM layer 230. The second electrode 202 comprises a free layer (free ferromagnetic layer) 210 and a cap layer 205. The free layer 210 is separated from the pinned layer 220 by a non-magnetic, electrically insulating tunnel barrier layer 215. In the absence of an external magnetic field, the free layer 210 has its magnetization oriented in the direction shown by arrow 212, that is, generally perpendicular to the magnetization direction of the pinned layer 220 shown by arrow 222 (tail of an arrow pointing into the plane of the paper). A first lead 260 and a second lead 265 formed in contact with first electrode 204 and second electrode 202, respectively, provide electrical connections for the flow of sensing current $I_s$ from a current source 270 to the MTJ sensor 200. A signal detector 280, typically including a recording channel such as a partial-response maximum-likelihood (PRML) channel, connected to the first and second leads 260 and 265 senses the change in resistance due to changes induced in the free layer 210 by the external magnetic field.

Differential GMR and MTJ sensors comprising dual SV or MTJ sensors, respectively, can provide increased magnetoresistive response to a signal field due to the additive response of the dual sensors connected in a differential circuit. However, even greater increases in magnetoresistive response may be obtainable from yet another type of GMR sensor known as a spin valve transistor (SVT) sensor.

A spin valve transistor sensor having a common base configuration and comprising an emitter Schottky barrier, a collector Schottky barrier and a ferromagnetic multilayer sandwiched between the silicon substrates of the two semiconductor elements was described by Monsma et al., Science, Vol. 281, 1998, pp. 407. Monsma et al. formed the SVT sensor by sandwiching a Co/Cu/Co/Pt multilayer between two semiconductor quality silicon (Si) substrates by a vacuum bonding technique. An emitter Schottky barrier was formed by a first Si semiconductor and the Pt metal layer and a collector Schottky barrier was formed by a second Si semiconductor and the outside Co layer of the Co/Cu/Co/Pt multilayer. The emitter Schottky barrier was negatively (forward) biased with a dc current source, and the collector Schottky barrier was positively (reverse) biased. The emitter bias accelerates electrons over the emitter Schottky barrier where they become hot electrons in the Co/Cu/Co/Pt multilayer common base. The number of hot electrons crossing the base and collected at the collector Schottky barrier is spin dependent due to the GMR effect in the multilayer common base. Magnetic alignment of the base layers by an external magnetic field results in increased collector current. The SVT sensor is expected to provide high magnetoresistance signals with high signal-to-noise ratios.

However, applications of the SVT sensor are hampered by a number of materials and process incompatibilities. First, the need for semiconductor quality silicon Schottky barriers requires very high temperature processing which is incompatible with formation of sharply defined layers of GMR-type sandwiched materials. Second, the vacuum bonding technique used to make SVT sensors is not suitable for mass fabrication of magnetic sensors and results in sensor thicknesses much greater than required for high density magnetic recording applications.

Therefore, there is a need for an SVT sensor that provides the advantages of improved magnetoresistive coefficient and high signal-to-noise ratio without the fabrication problems associated with the materials/process incompatibilities inherent in the use of semiconductor materials together with spin valve sandwich materials.

SUMMARY OF THE INVENTION

It is the object of the present invention to disclose a spin valve transistor (SVT) sensor using a magnetic tunnel junction (MTJ) element.

It is another object of the present invention to disclose an SVT sensor using an MTJ element having dimensions compatible with the requirements for magnetic recording sensors used in high density storage applications.

It is a further object of the present invention to disclose an SVT sensor having an MTJ element with high magnetoresistance coefficient and improved signal-to-noise ratio.

It yet another object of the present invention to disclose a process for making an SVT sensor having an MTJ element for use in high density storage applications.

In accordance with the principles of the present invention, there is disclosed a spin valve transistor (SVT) sensor having an emitter element, a collector element and a common base element disposed between the emitter and collector elements. The emitter element comprises an antiferromagnetic layer, a ferromagnetic pinned layer and an electrically insulating first tunnel barrier layer. The collector element comprises an electrically insulating second tunnel barrier layer and a nonmagnetic metal layer. A ferromagnetic free layer disposed between the emitter and collector elements provides the common base element of the SVT sensor. The antiferromagnetic layer, the ferromagnetic pinned layer, the insulating first tunnel barrier layer and the ferromagnetic free layer form a magnetic tunnel junction (MTJ) element.

The emitter element is biased negatively with respect to the base element and the collector element is biased positively with respect to the base element. The negative emitter allows an emitter-base electron current to flow by tunneling through the first tunnel barrier layer. A fraction of this emitter-base current is thermally excited (hot) electrons which can cross the base element layer and pass over the energy barrier of the second tunnel barrier layer which was lowered by the negative bias applied to the emitter element. This hot electron current is strongly spin polarized and, due to the GMR effect in the MTJ element, the magnitude of the current flowing into the collector element (base-collector current) is strongly dependent on the relative orientation of the magnetizations of the pinned and free ferromagnetic layers of the MTJ element. The fraction of the emitter-base current that is not sufficiently energetic to pass over the energy barrier of the second tunnel barrier layer or that is scattered while traversing the base element or scattered at the interfaces flows back to the emitter current supply via a common base electrode connected to the base element. Changes of the magnitude of the base-collector current are detected by a signal detector in the base-collector circuit and provide a sensitive measure of external magnetic (signal) fields from the surface of a magnetic recording disk or any other suitable signal source.

The SVT sensor of the present invention comprises thin layers of materials that may be vacuum deposited using methods known to the art that are compatible with the requirements for mass fabrication of magnetic sensors for high data density applications.

The above as well as additional objects, features, and advantages of the present invention will become apparent in the following detailed description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 1:
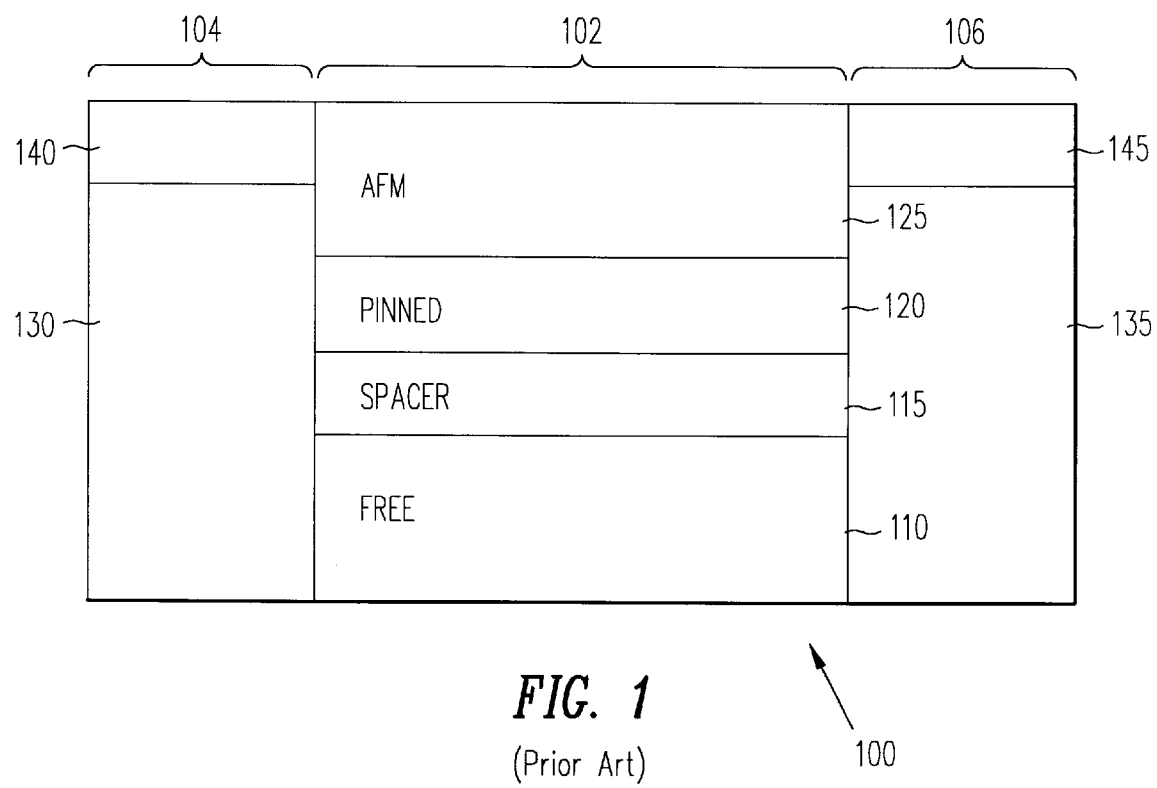
FIG. 1 is an air bearing surface view, not to scale, of a prior art SV sensor.
Figure 2:
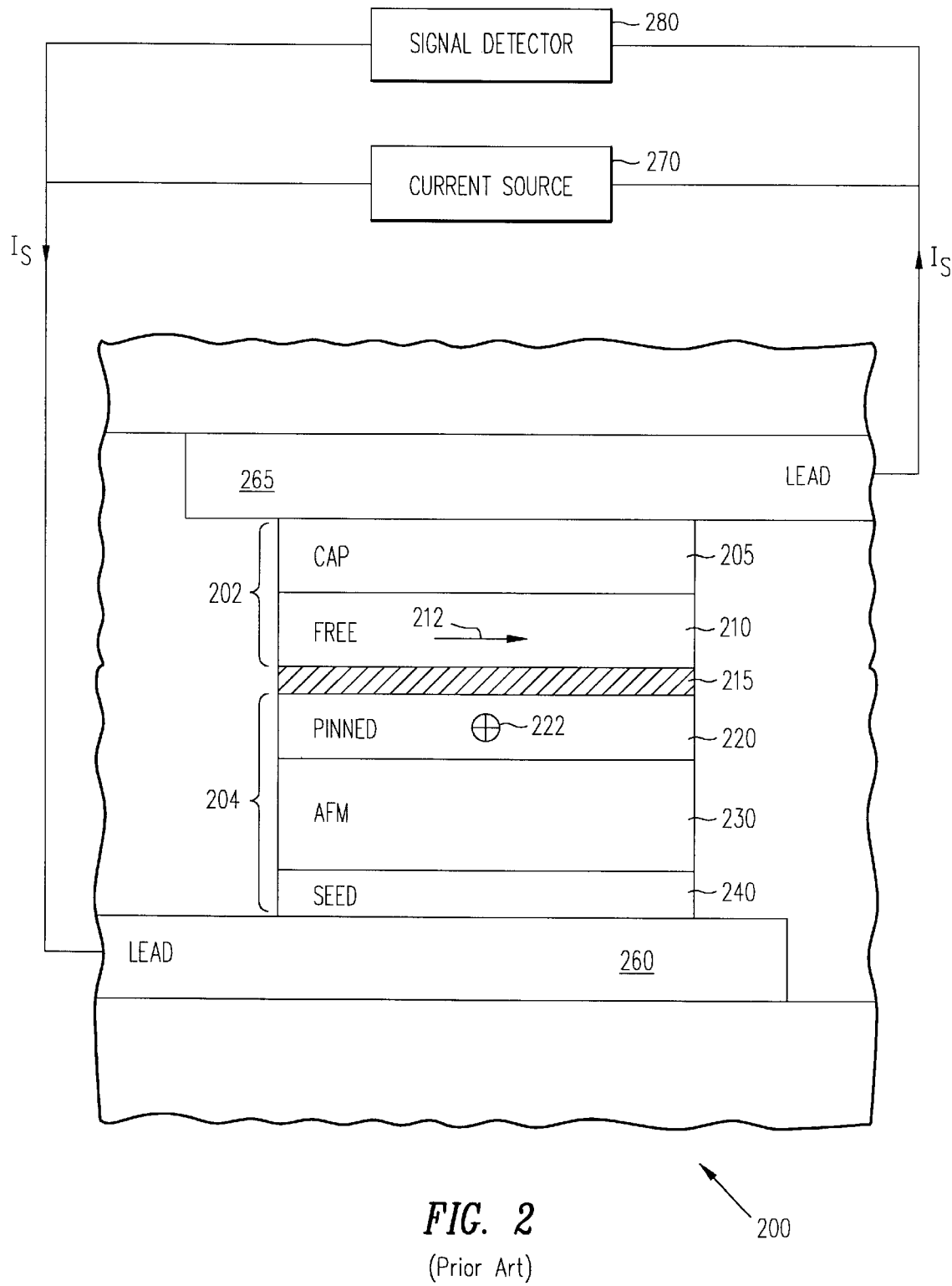
FIG. 2 is an air bearing surface view, not to scale, of a prior art MTJ sensor.
Figure 3:
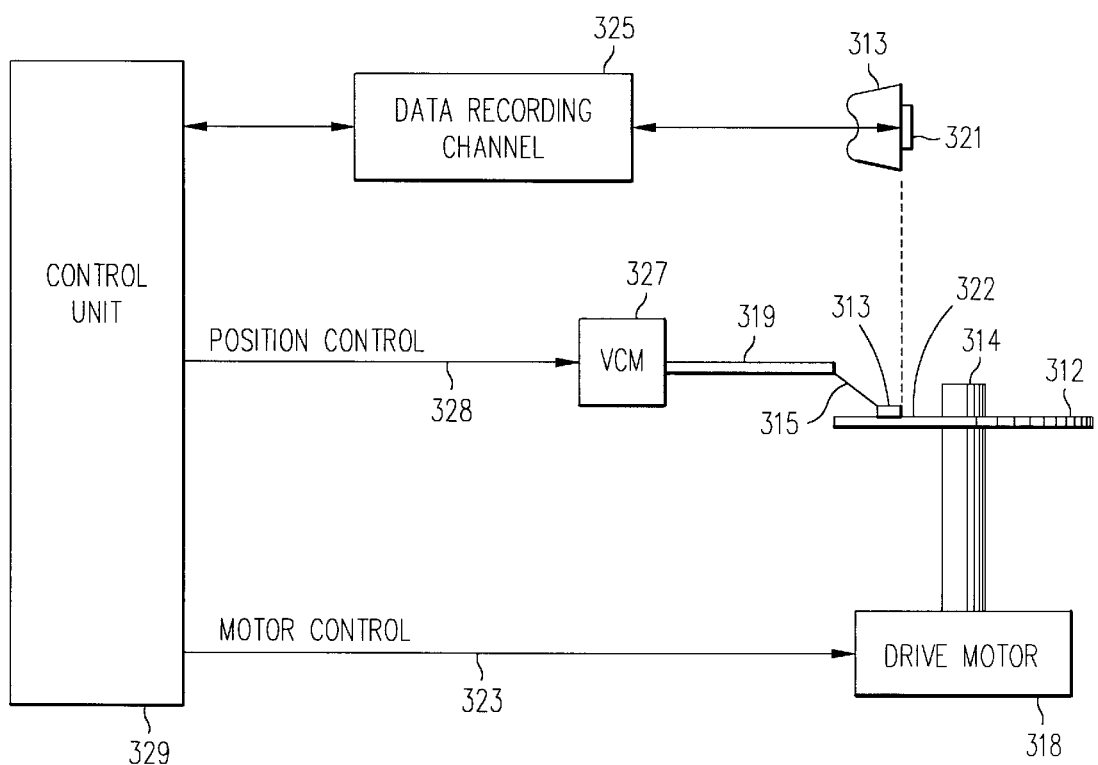
FIG. 3 is a simplified diagram of a magnetic recording disk drive system using the spin valve transistor sensor of the present invention.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on the disk 312.

At least one slider 313 is positioned on the disk 312, each slider 313 supporting one or more magnetic read/write heads 321 where the head 321 incorporates the SVT sensor of the present invention. As the disks rotate, the slider 313 is moved radially in and out over the disk surface 322 so that the heads 321 may access different portions of the disk where desired data is recorded. Each slider 313 is attached to an actuator arm 319 by means of a suspension 315. The suspension 315 provides a slight spring force which biases the slider 313 against the disk surface 322. Each actuator arm 319 is attached to an actuator 327. The actuator as shown in FIG. 3 may be a voice coil motor (VCM). The VCM comprises a coil movable within a fixed magnetic field, the direction and speed of the coil movements being controlled by the motor current signals supplied by a controller 329.

During operation of the disk storage system, the rotation of the disk 312 generates an air bearing between the slider 313 (the surface of the slider 313 which includes the head 321 and faces the surface of the disk 312 is referred to as an air bearing surface (ABS)) and the disk surface 322 which exerts an upward force or lift on the slider. The air bearing thus counter-balances the slight spring force of the suspension 315 and supports the slider 313 off and slightly above the disk surface by a small, substantially constant spacing during normal operation.

The various components of the disk storage system are controlled in operation by control signals generated by the control unit 329, such as access control signals and internal clock signals. Typically, the control unit 329 comprises logic control circuits, storage chips and a microprocessor. The control unit 329 generates control signals to control various system operations such as drive motor control signals on line 323 and head position and seek control signals on line 328. The control signals on line 328 provide the desired current profiles to optimally move and position the slider 313 to the desired data track on the disk 312. Read and write signals are communicated to and from the read/write heads 321 by means of the recording channel 325. Recording channel 325 may be a partial response maximum likelihood (PMRL) channel or a peak detect channel. The design and implementation of both channels are well known in the art and to persons skilled in the art. In the preferred embodiment, recording channel 325 is a PMRL channel.

The above description of a typical magnetic disk storage system, and the accompanying illustration of FIG. 3 are for representation purposes only. It should be apparent that disk storage systems may contain a large number of disks and actuator arms, and each actuator arm may support a number of sliders.

Figure 4:
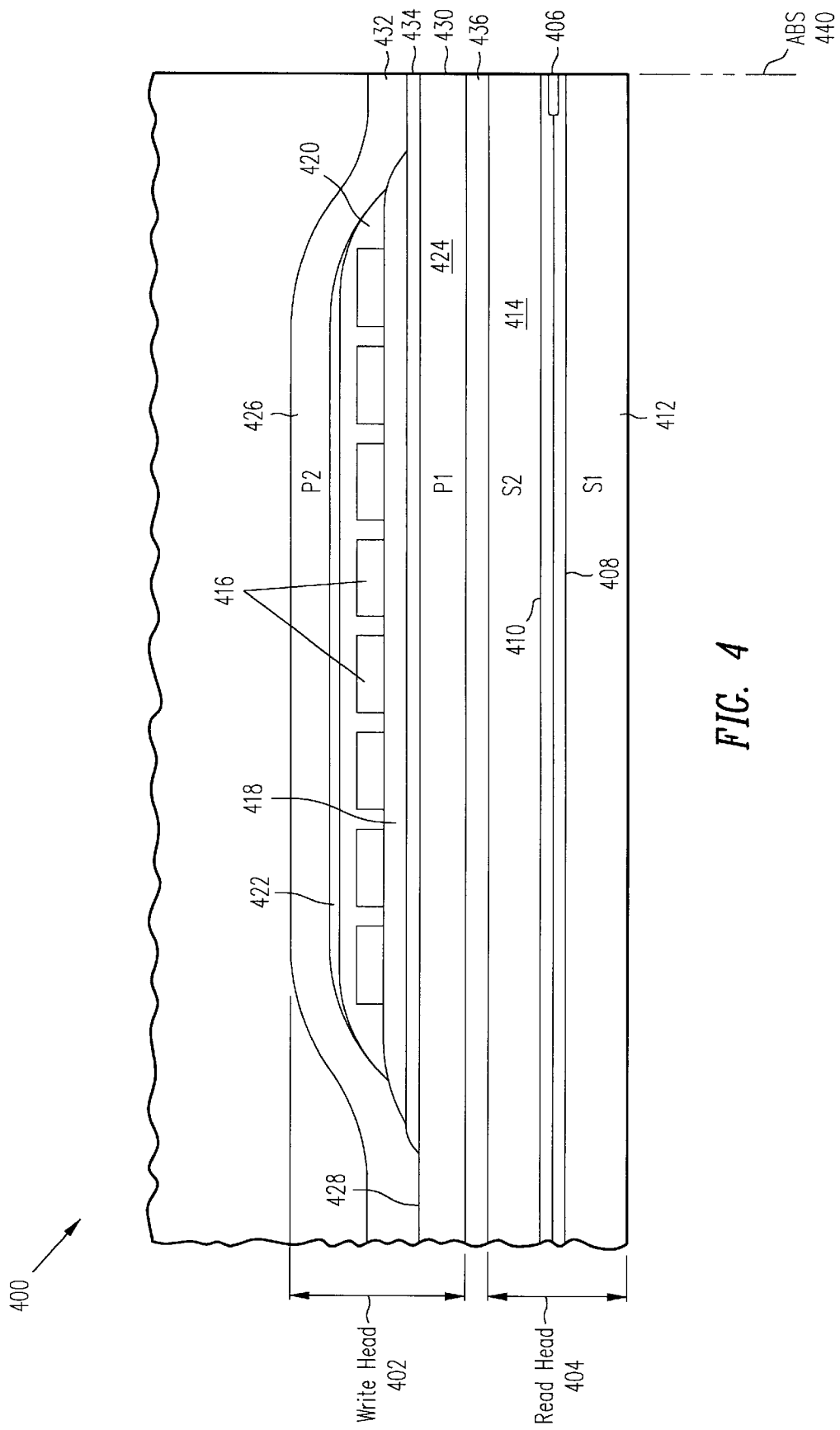
FIG. 4 is a vertical cross-section view, not to scale, of a "piggyback" read/write magnetic head.

FIG. 4 is a side cross-sectional elevation view of a "piggyback" magnetic read/write head 400, which includes a write head portion 402 and a read head portion 404, the read head portion employing a spin valve transistor (SVT) sensor 406 according to the present invention. The SVT sensor 406 is sandwiched between nonmagnetic insulative first and second read gap layers 408 and 410, and the read gap layers are sandwiched between ferromagnetic first and second shield layers 412 and 414. In response to external magnetic fields, the resistance of the SVT sensor 406 changes. A sense current $I_s$ conducted through the sensor causes these resistance changes to be manifested as potential changes. These potential changes are then processed as readback signals by the processing circuitry of the data recording channel 346 shown in FIG. 3.

The write head portion 402 of the magnetic read/write head 400 includes a coil layer 416 sandwiched between first and second insulation layers 418 and 420. A third insulation layer 522 may be employed for planarizing the head to eliminate ripples in the second insulation layer 420 caused by the coil layer 416. The first, second and third insulation layers are referred to in the art as an insulation stack. The coil layer 416 and the first, second and third insulation layers 418, 420 and 422 are sandwiched between first and second pole piece layers 424 and 426 The first and second pole piece layers 424 and 426 are magnetically coupled at a back gap 428 and have first and second pole tips 430 and 432 which are separated by a write gap layer 434 at the ABS 440. An insulation layer 436 is located between the second shield layer 414 and the first pole piece layer 424. Since the second shield layer 414 and the first pole piece layer 424 are separate layers this read/write head is known as a "piggyback" head.

Figure 5:
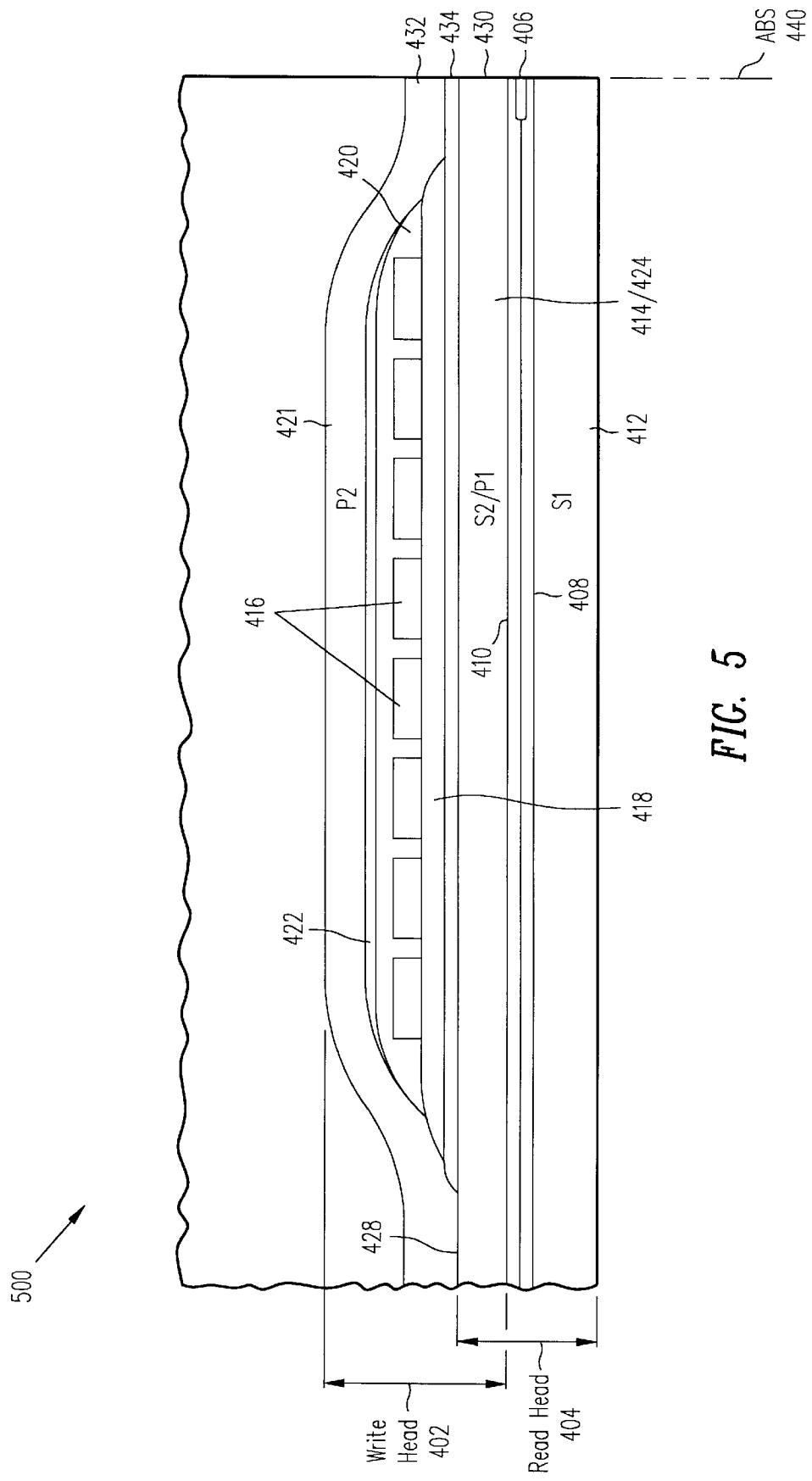
FIG. 5 is a vertical cross-section view, not to scale, of a "merged" read/write magnetic head.

FIG. 5 is the same as FIG. 4 except the second shield layer 514 and the first pole piece layer 524 are a common layer. This type of read/write head is known as a "merged" head 500. The insulation layer 436 of the piggyback head in FIG. 4 is omitted in the merged head 500 of FIG. 5.

Figure 6:
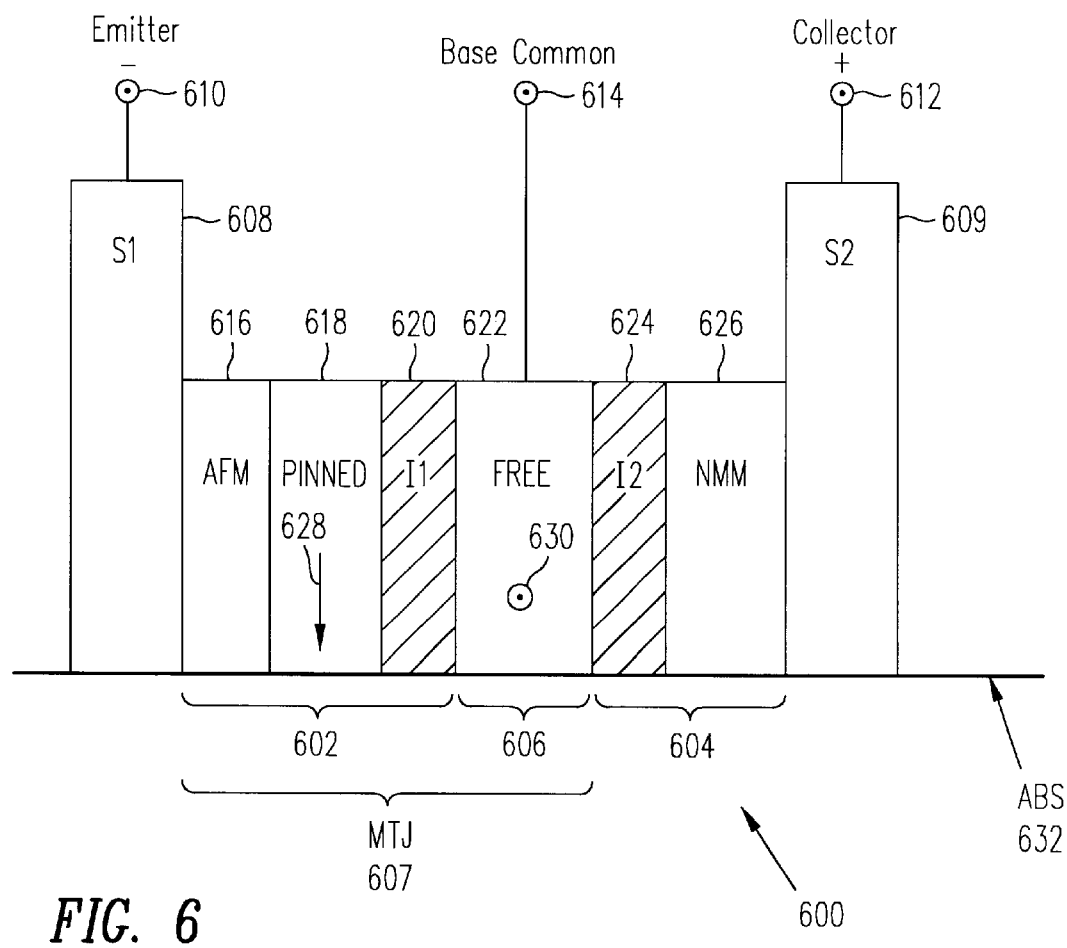
FIG. 6 is a vertical cross-section view, not to scale, of an embodiment of the spin valve transistor sensor of the present invention.

FIG. 6 shows a vertical cross-section view of a spin valve transistor (SVT) sensor 600 according to a first embodiment of the present invention. The SVT sensor 600 comprises an emitter element 602, a collector element 604 and a common base element 606 disposed between the emitter element 602 and the collector element 604. The emitter, base, and collector elements 602, 606, 604 are sandwiched between ferromagnetic first and second shields S1 and S2 608, 609 which also serve as electrical leads for the emitter and collector connections 610, 612 of the SVT sensor. A base connection 614 is electrically connected to the common base element 606 to provide the common base connection of the SVT sensor 600.

The emitter element 602 includes an antiferromagnetic (AFM) layer 616, a ferromagnetic pinned layer 618, and a first tunnel barrier layer (I1) 620. The collector element 604 includes a second tunnel barrier layer (I2) 624 and a non-magnetic metal (NMM) layer 626. A ferromagnetic free layer 622 sandwiched between the first and second tunnel barrier layers 620 and 624 serves as the common base element 606 of the SVT sensor 600. The AFM layer 616, ferromagnetic pinned layer 618, first tunnel barrier layer 620, and ferromagnetic free layer 622 form an MTJ element 607.

For operation of the SVT sensor 600, the emitter connection 610 is biased to a negative potential with respect to the common base connection 614 and the collector connection 612 is biased to a positive potential with respect to the common base connection 614. In the MTJ element 607, the magnetic moment 628 of the ferromagnetic pinned layer 618 is fixed in a direction perpendicular to the ABS 632. The magnetic moment 630 (represented by an arrow head pointing out of the plane of the paper) of the ferromagnetic free layer 622 is oriented in the plane of the ABS 632 in the absence of an external field and is free to rotate in the presence of an external magnetic field (signal field) from the surface of a disk.

Figure 7:
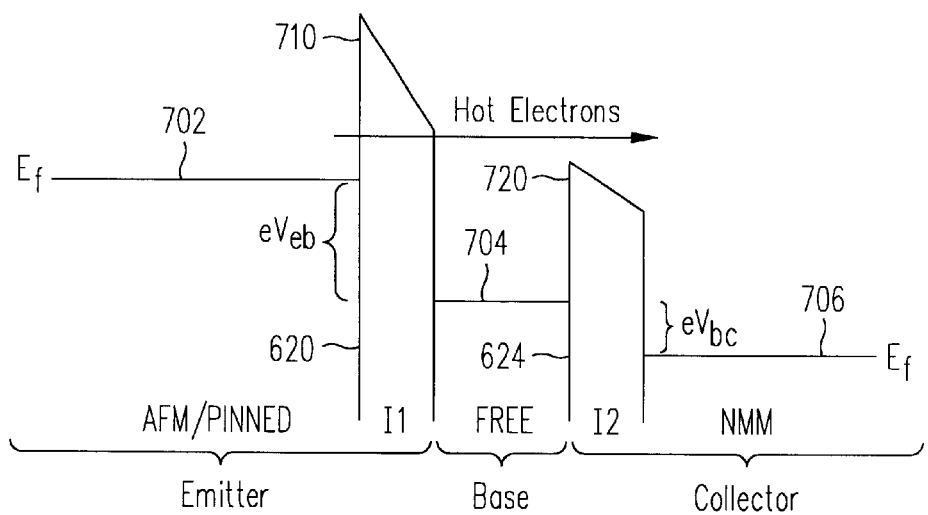
FIG. 7 is an energy band diagram of the spin valve transistor sensor of the present invention.

FIG. 7 is an energy band diagram of the SVT sensor 600. The first tunnel barrier layer (I1) 620, represented by a first barrier 710, separates the Fermi levels 702 and 704 (represented by horizontal lines) in the metallic conduction bands of the AFM/pinned layers 616/618 and the free layer 622, respectively. The second tunnel barrier layer 624, represented by a second barrier 720, separates the Fermi levels 704 and 706 in the metallic conduction bands of the free layer 622 and the NMM layer 626, respectively. The emitter/base bias voltage $V_{eb}$ raises the Fermi level 702 of the emitter relative to the Fermi level 704 of the base allowing electrons to tunnel through the first tunnel barrier layer 620 into the free layer 622. The base-collector bias voltage $V_{bc}$ lowers the Fermi level 706 of the collector relative to the Fermi level 704 of the base, however by making $V_{bc}$ small compared to $V_{eb}$ and by choosing the thickness of the second tunnel barrier layer 624 to be greater than the thickness of the first tunnel barrier layer 620, the electron tunnel current from the base to the collector is much smaller than the emitter-base tunnel current. The emitter-base bias voltage $V_{eb}$ lowers the second barrier 720 relative to the emitter Fermi level 702, allowing hot electrons (electrons having energies significantly higher than the Fermi level 702) in the emitter to tunnel through the first tunnel barrier layer 620, over the second barrier 720 and to be collected in the NMM layer 626 of the collector element 604.

Because of the GMR effect in the MTJ element 607, the magnitude of the electron tunnel current through the first tunnel barrier layer 620 is strongly dependent on the relative orientation of the magnetic moments 628 and 630 of the ferromagnetic pinned layer 618 and the ferromagnetic free layer 622, respectively. When the magnetic moments 628 and 630 are parallel, the tunneling current is maximum, and when the magnetic moments are antiparallel, the tunneling current is mimimum. In the presence of an external field (signal field), the magnetic moment 630 of the free layer 622 rotates relative to the fixed magnetic moment 628 of the pinned layer 618 resulting in a modulation of the hot electron tunneling current from the emitter to the collector of the SVT sensor 600.

Figure 8:
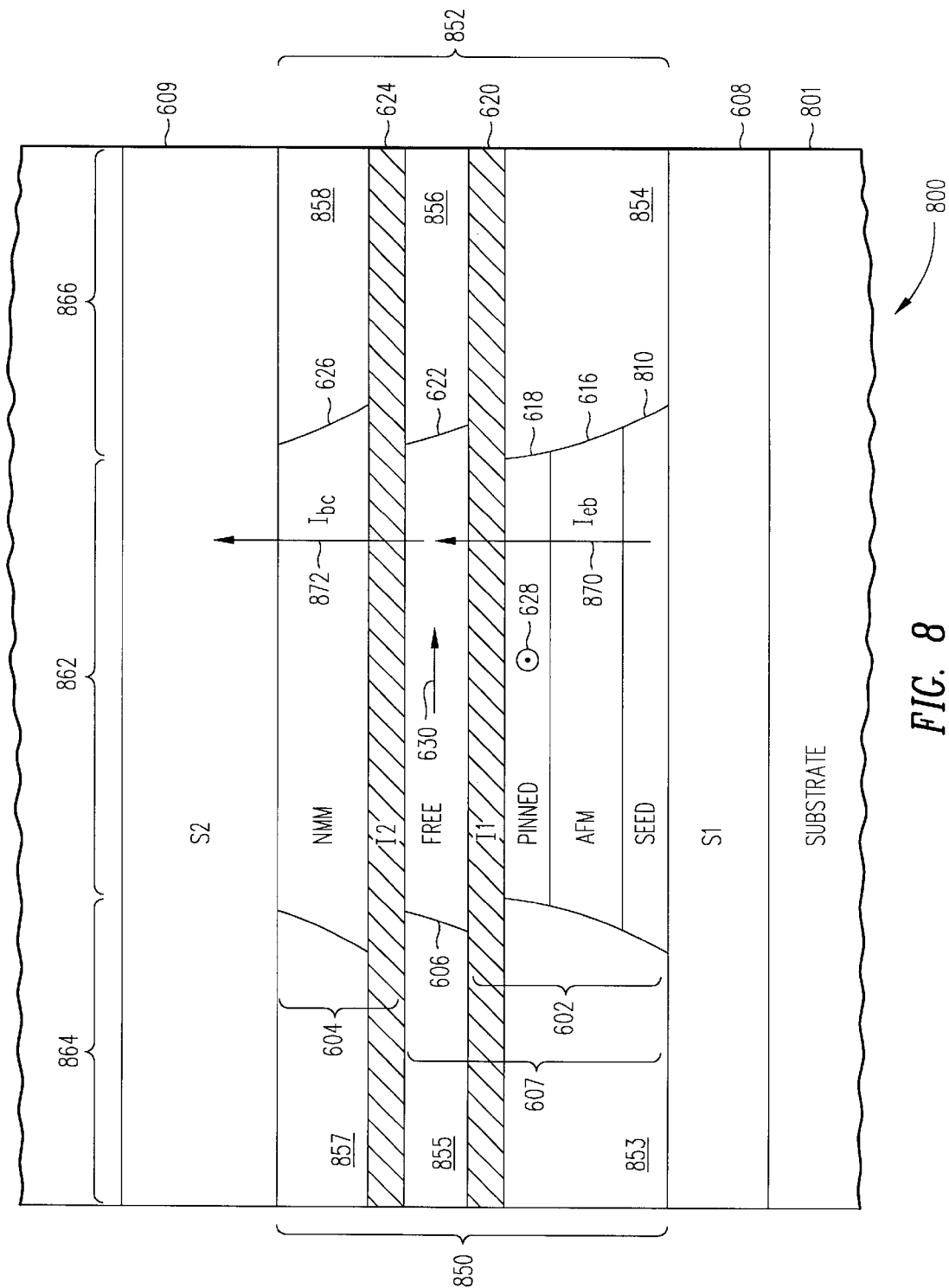
FIG. 8 is an air bearing surface view, not to scale, of an embodiment of the spin valve transistor sensor of the present invention.

FIG. 8 shows an air bearing surface (ABS) view, not to scale, of an SVT sensor 800 according to the first embodiment of the present invention. The SVT sensor 800 comprises passive end regions 864 and 866 separated from each other by an active central region 862. The active region of the SVT sensor 800 comprises an emitter element 602, a collector element 604 and a common base element 606 formed in the central region 862. The emitter element 602 is formed directly on a first shield 608 in the central region 862. The first shield 608 is a layer of soft ferromagnetic material such as Ni—Fe (permalloy), or alternatively Al—Fe—Si (Sendust), deposited on a substrate 801 and extending over the central region 862 and the end regions 864 and 866 to provide magnetic shielding of the SVT sensor 800 from stray magnetic fields.

The emitter element 602 includes a seed layer 810, a ferromagnetic pinned layer 618, an AFM layer 616 disposed between the pinned layer 618 and the seed layer 810, and a first tunnel barrier layer 620 adjacent to the ferromagnetic pinned layer 618. The AFM layer 616 is exchange coupled to the pinned layer 618 providing an exchange field to pin the magnetization direction 628 of the pinned layer 618 perpendicular to the ABS.

The collector element 604 comprises a non-magnetic metal (NMM) layer 626 adjacent to a second tunnel barrier layer 624. A free layer 622 disposed between the first and second tunnel barrier layers 620 and 624 also serves as the common base element 606 of the SVT sensor 800.

Insulator layers 850 and 852 of electrically insulating material such as $Al_2O_3$ are formed in the end regions 664 and 666, respectively, on the first shield 608 and in abutting contact with the emitter element 602, the base element 606 and the collector element 604. A second shield 609 of soft ferromagnetic material such as Ni—Fe, or alternatively Al—Fe—Si, is formed over the insulator layers 850 and 852 in the end regions 864 and 866, respectively, and over the NMM layer 626 in the central region 862.

If longitudinal stabilization of the magnetic domain states of the ferromagnetic free layer 622 of the MTJ element 607 is desired, hard bias layers may be provided in the end regions 864 and 866 as is known in the art. IBM's U.S. Pat. No. 5,729,410 granted to Fontana et al., and incorporated herein by reference, describes such a longitudinal biasing method for an MTJ sensor.

Figure 9:
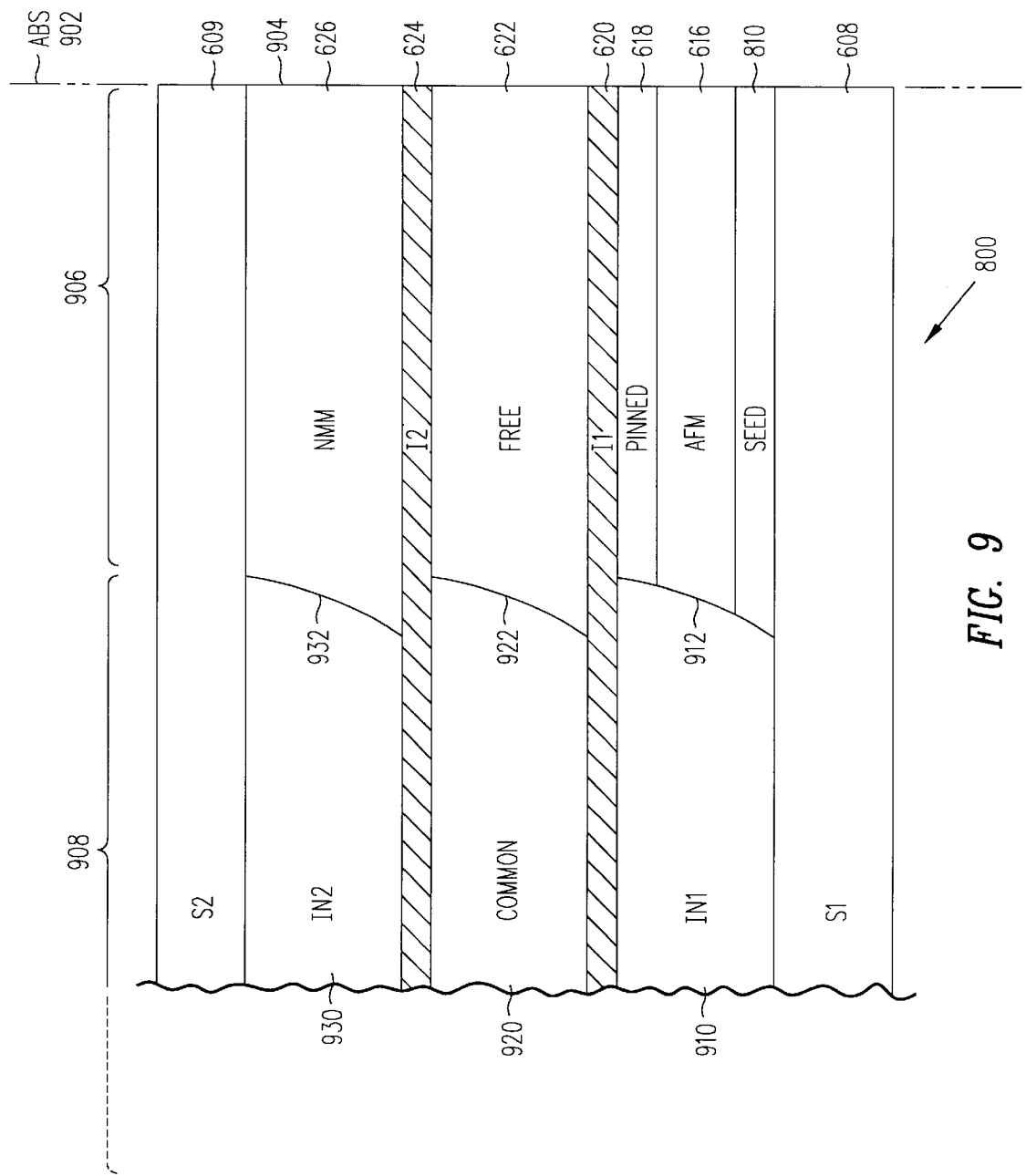
FIG. 9 is a vertical cross-section view, not to scale, of a first embodiment of the spin valve transistor sensor of the present invention.

FIG. 9 shows a vertical cross-section view, not to scale, of the SVT sensor 800. The SVT sensor 800 has a front region 906 and a back region 908. The active region of the SVT sensor 800 is formed in the front region 906 and has a front edge 904 at the ABS 902 and back edges 912, 922 and 932. The back edges 912, 922 and 932 define the back edges of the emitter element 602 seed/AFM/pinned layers 810/616/618, the free layer 622 and the NMM layer 626, respectively. A common electrode 920 is formed in the back region 908 to provide electrical contact to the ferromagnetic free layer 622 at the back edge 922. First and second insulator layers 910 and 930 are formed in the back region 908 in abutting contact to the back edges 912 and 932, respectively, to provide electrical insulation between the first and second shields 608 and 609 and the common electrode 920. First and second tunnel barrier layers 620 and 624 add to the electrical insulation between the shield layers and the common electrode provided by first and second insulating layers 910 and 930.

The SVT sensor 800 may be fabricated in a magnetron sputtering or an ion beam sputtering system to sequentially deposit the multilayer structure shown in FIGS. 8 and 9. The first shield 608 of Ni—Fe having a thickness in the range of 5000–10000 Å is deposited on the substrate 801. The seed layer 810, the AFM layer 616, and the pinned layer 618 are sequentially deposited over the first shield 608 in the presence of a longitudinal or transverse magnetic field of about 40 Oe to orient the easy axis of all the ferromagnetic layers. The seed layer 810 is a layer deposited to modify the crystallographic texture or grain size of the subsequent layers, and may not be needed depending on the material of the subsequent layer. In the preferred embodiment, the seed layer 810 is formed of Ni—Mn—O, or alternatively of Ta, having a thickness of about 30 Å deposited on the first shield 608 and a Co—Fe layer having a thickness of about 10 Å deposited on the Ni—Mn—O layer. The AFM layer 616 formed of Ir—Mn, or alternatively Pt—Mn, Pt—Pd—Mn, or Ni—Mn, having a thickness in the range of 50–250 Å is deposited on the seed layer 810. The ferromagnetic pinned layer 618 may be formed of Co—Fe having a thickness in the range of 20–150 Å, or alternatively, may be formed of a sub-layer of Ni—Fe having a thickness in the range of 20–150 Å deposited on the AFM layer 616 and an interface layer of cobalt (Co) having a thickness of about 5 Å deposited on the Ni—Fe sub-layer.

The bottom layers of the emitter element 602 are defined in the central region 862 of FIG. 8 and in the front region 906 of FIG. 9 by depositing a photoresist and using photolithography and ion milling processes well known in the art. The ion milling process defines the back edge 912 of the bottom layers of the emitter element 602. The first insulator layer (IN1) 910 and the bottom portions 853 and 854 of insulator layers 850 and 852 can now be deposited on the first shield 608 in the back region 908 and in the end regions 864 and 866, respectively. The insulator layer 910, 853 and 854 are formed of $Al_2O_3$ having a thickness approximately equal to the total thickness of the seed layer 810, the AFM layer 616 and the pinned layer 618 by depositing and then plasma oxidizing a layer of aluminum (Al). The photoresist protecting the bottom layers of the emitter element 602 is then removed and the first tunnel barrier layer 620 is formed of $Al_2O_3$ by depositing and then plasma oxidizing a 5–15 Å aluminum layer on the pinned layer 618 and on the insulator layers 910, 853 and 854 in the back region 908 and the edge regions 864 and 866.

The ferromagnetic free layer 622 is deposited over the first tunnel barrier layer 620 in the presence of a longitudinal or transverse magnetic field of about 40 Oe to orient the easy axis of the ferromagnetic layer. The free layer 622 is formed of either Co or Fe, or alternatively, of either Co—Fe or Ni—Fe, having a thickness in the range of 5–100 Å deposited on the first tunnel barrier layer 620. The free layer 622 formed of Co or Fe is preferred when a large mean free path for electron transport through the free layer is desired in order to obtain large collector current, $I_c$, in the SVT sensor 800. The free layer 622 formed of Co—Fe or Ni—Fe is preferred when a large coefficient, $\Delta I_c/I_c$, is desirable from the SVT sensor 800 in response to a signal magnetic field.

The free layer 622 is defined in the central region 862 of FIG. 8 and in the front region 906 of FIG. 9 by depositing a photoresist and using photolithography and ion milling processes well known in the art. The ion milling process defines the back edge 922 of the free layer 622. The common electrode 920 can subsequently be deposited on the first tunnel barrier layer 620 in the edge regions 864 and 866 and in the back region 908 to form a conducting lead electrically connected to the free layer 622 at the back edge 922. The common electrode 920 is formed of a nonmagnetic conducting metal such as gold (Au) having a thickness approximately equal to the total thickness of the free layer 622. Another photoresist and photolithography step is used to protect the common electrode 920 in the back region 908 and ion milling is used to remove the common electrode material from the edge regions 864 and 866. An insulator layer formed of $Al_2O_3$ having a thickness approximately equal to the thickness of the free layer 622 is formed by depositing and then plasma oxidizing a layer of aluminum on the first tunnel barrier layer 620 in the edge regions 864 and 866 to provide the middle portions 855 and 856 of the insulator layers 850 and 852, respectively.

The photoresist protecting the free layer 622 and the photoresist protecting the common electrode 920 are removed and the second tunnel barrier layer 624 is formed of $Al_2O_3$ by depositing and then plasma oxidizing a 5–25 Å aluminum layer on the free layer 622, on the common electrode 920 in the back region 908 and on the middle portions 855 and 856 of the insulator layers 850 and 852 in the edge regions 864 and 866. Alternatively, the second tunnel barrier layer may be formed of AlN, BN, $TiO_2$ or ZnO deposited on the free layer 622 in order to obtain a lower barrier layer than the first tunnel barrier layer 620. The nonmagnetic metal (NMM) layer 626 is formed of platinum (Pt) having a thickness in the range of 30–100 Å, or alternatively, of gold (Au), aluminum (Al), copper (Cu), silver (Ag) or another high electrical conductivity metal deposited on the second tunnel barrier layer 624. The NMM layer 626 is defined in the central region 862 and in the front region 906 by depositing a photoresist and using photolithography and ion milling processes well known in the art. The ion milling process defines the back edge 932 of the NMM layer 626. The insulator layer (IN2) 930 and the top portions of 857 and 858 of insulator layers 850 and 852 can now be deposited on the second tunnel barrier layer 624 in the back region 908 and in the end regions 864 and 866, respectively. The insulator layers 930, 857 and 858 are formed of $Al_2O_3$ by depositing and then plasma oxidizing an aluminum layer having a thickness approximately equal to the thickness of the NMM layer 626. The photoresist protecting the NMM layer 626 is removed and the second shield 609 of Ni—Fe having a thickness in the range of 5000–10000 Å is deposited on the front and rear portions 906 and 908 of the SVT sensor 800.

Referring again to FIGS. 8 and 9, the first shield 608 and the common electrode 920 provide electrical connections for the flow of emitter-base current $I_{eb}$ to the MTJ element 602 of the SVT sensor 800. In the MTJ element 607, the flow of emitter-base current $I_{eb}$ (shown as an electron current) is in a direction perpendicular to the plane of the first tunnel barrier layer 620 as shown by arrow 870. The second shield 609 and the common electrode 920 provide electrical connections for the flow of a base-collector current $I_{bc}$ through the second tunnel barrier layer 624 from the free layer 622 to the NMM layer 626. The base-collector current $I_{bc}$ (shown as an electron current) flows in a direction perpendicular to the plane of the second tunnel barrier layer 624 as shown by arrow 872. Insulator layers 850 and 852 provide electrical insulation in the end regions 864 and 866, respectively, preventing shunting of the emitter-base and base-collector currents $I_{eb}$ and $I_{bc}$ around the active central region 862 of the SVT sensor 800.

After the fabrication process of the SVT sensor 800 has been completed, the magnetization of the pinned layer 618 must be fixed perpendicular to the ABS as shown by the arrow 628 (head of the arrow pointing out of the plane of the paper). Since the AFM layer 616 fixes the magnetization direction of the pinned layer 618, the AFM layer is oriented by heating the SVT sensor 800 above the blocking temperature of the antiferromagnetic material being used (the blocking temperature of Ir—Mn is approximately 250° C.) and then with an external magnetic field greater than about 5000 Oe applied perpendicular to the ABS, cooling the sensor. After setting the AFM layer 616 in the external magnetic field, the magnetization of the pinned layer 618 is fixed perpendicular to the ABS.

Figure 10:
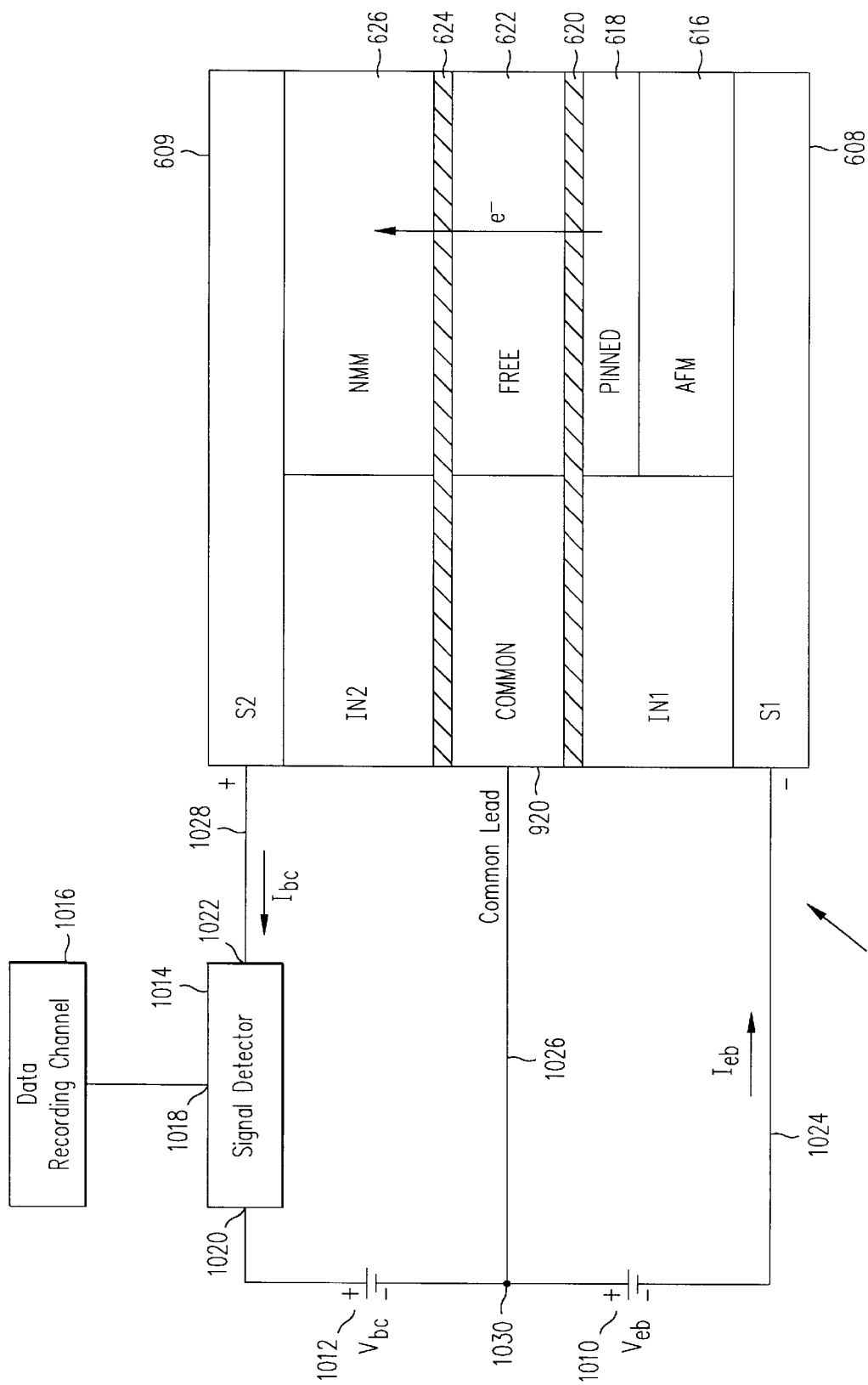
FIG. 10 is a schematic diagram illustrating a circuit employing the spin valve transistor sensor according to an embodiment of the present invention.

FIG. 10 is a schematic diagram illustrating a circuitry 1000 employing the SVT sensor 800 according to the first embodiment of the present invention. Circuitry 1000 comprises SVT sensor 800 having first shield 608 and second shield 609 electrodes and a common electrode 920, an emitter-base bias supply 1010, a base-collector bias supply 1012 and a signal detector 1014. The signal detector 1014 has a first input terminal 1020, a second input terminal 1022 and an output terminal 1018. The first input terminal 1020 of the signal detector 1014 is connected to the positive terminal of the base-collector bias supply 1012 and the second input terminal 1022 is connected via wire 1028 to the second shield 609.

Referring now to FIGS. 7 and 10, the emitter-base bias supply 1010 is connected via wire 1024 to the first shield 608 and via wire 1026 to the common electrode 920 to provide the emitter-base bias voltage $V_{eb}$ across the first tunnel barrier layer 620. The emitter-base bias voltage $V_{eb}$ lowers the Fermi level 704 of the free layer and the barrier height 720 of the second tunnel barrier layer 624 relative to the Fermi level 702 of the pinned layer allowing electrons to tunnel through the first tunnel barrier layer 620. A thermally excited fraction of the tunneling electrons (hot electrons) have sufficient energy to drift through the free layer and over the barrier height 720 of the second tunnel barrier layer 624. The emitter-base current $I_{eb}$ (shown as an electron current) includes the tunneling hot electrons and the thermal electrons tunneling through the first tunnel barrier layer 620 in the energy range $eV_{Veb}$ electron volts.

The base-collector bias source 1012 is connected to the first input terminal 1020 of the signal detector 1014 and via lead 1026 to the common electrode 920 to provide a base-collector bias voltage $V_{bc}$ across the second tunnel barrier layer 624. The positive terminal of the emitter-base bias source 1010 and the negative terminal of the base-collector bias source 1012 are connected at a common node 1030 to the wire 1026 connected to the common electrode 920. The base-collector current $I_{bc}$ (shown as an electron current) includes the tunneling hot electrons that drift into the NMM layer 626 and the small current of thermal electrons tunneling through the second tunnel barrier layer 624 in the energy range $eV_{bc}$ electron volts. The hot electron current from the pinned layer 618 to the NMM layer 626 is indicated by the arrow labelled e⁻. The base-collector current $I_{bc}$ flows from the NMM layer 626 via the second shield 609 and wire 1028 to the signal detector 1014. The output terminal 1018 of the signal detector 1014 is then connected to the data recording channel 1016 for further processing according to the description of FIG. 3.

Figure 11:
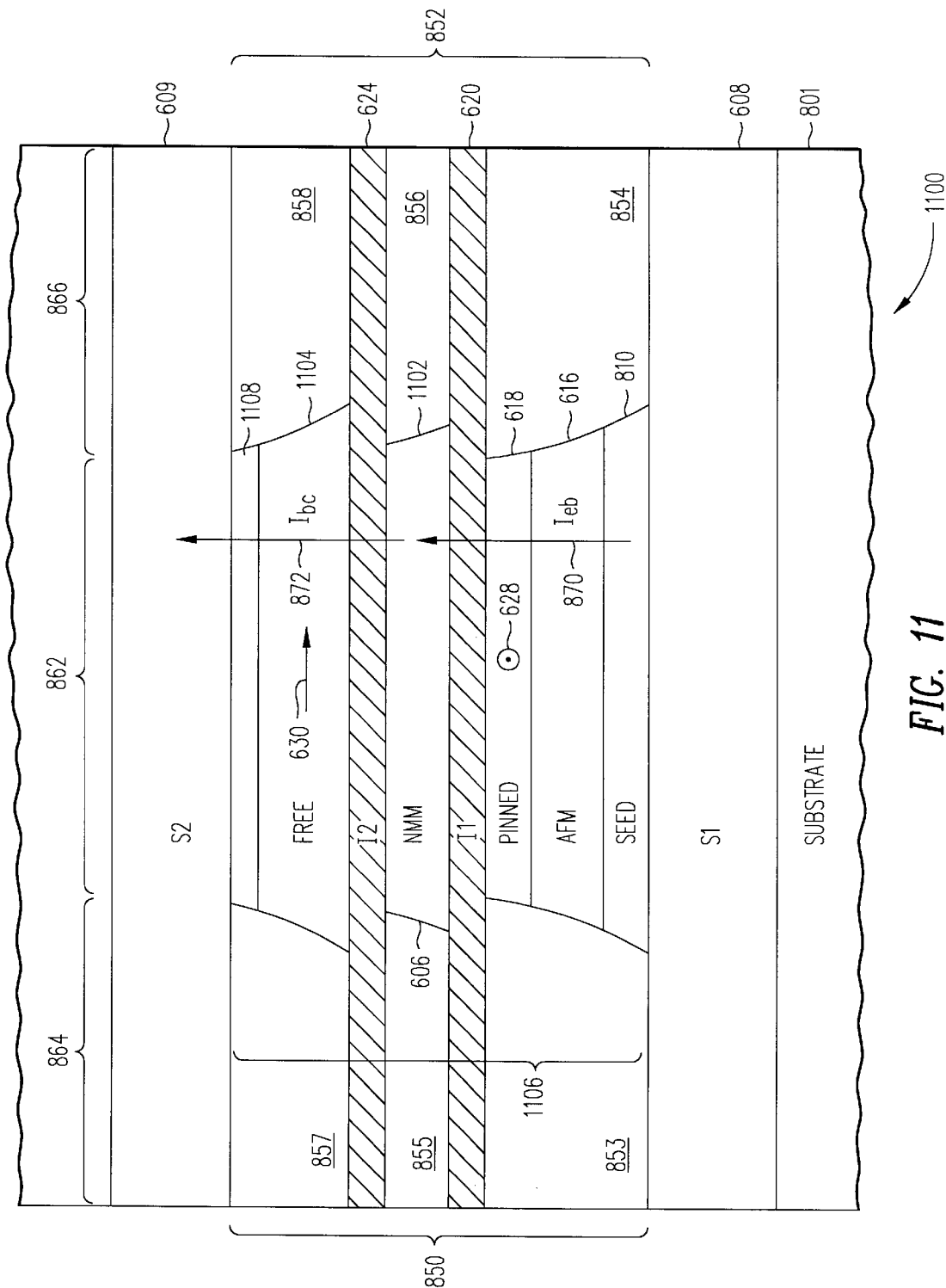
FIG. 11 is an air bearing surface (ABS) view, not to scale, of a second embodiment of the spin valve transistor sensor of the present invention.

FIG. 11 shows an ABS view, not to scale, of an SVT sensor 1100 according to a second embodiment of the present invention. The SVT sensor 1100 differs from the SVT sensor 800 by having a nonmagnetic metal (NMM) layer 1102 sandwiched between the first and second tunnel barrier layers 620 and 624 and having a ferromagnetic free layer 1104 disposed between the second tunnel barrier layer 624 and the second shield 609. A magnetic isolation layer 1108 made of a nonmagnetic metal, preferably Ta, is disposed between the ferromagnetic free layer 1104 and the second shield 609 to magnetically decouple the free layer 1104 from the second shield 609. With this layer configuration, the MTJ element 1106 includes all the layers sandwiched between the first and second shields 608 and 609. The NMM layer 1102, electrically connected to the common electrode layer 920 formed in abutting contact to the NMM layer 1102, is the common base element 606 of the SVT sensor 1100.

Operation of the SVT sensor 1100 is similar to the operation of the SVT sensor 800 with the main component of the base-collector current $I_{bc}$ being the hot electrons tunneling through the first tunnel junction 620 and drifting over the second barrier 720, shown in FIG. 7, of the second tunnel junction 624. An advantage of having the NMM layer 1102 as the base element 606 is that nonmagnetic metals have longer electron mean free paths than ferromagnetic metals leading to higher efficiency for hot electron transport across the base element 606. More efficient hot electron transport leads to an increased base-collector current $I_{bc}$ and therefore a larger signal. Modulation of $I_{bc}$ by external magnetic fields occurs due to the GMR effect when the magnetization directions 628 and 630 of the ferromagnetic pinned layer 618 and the ferromagnetic free layer 1104, respectively, change relative to each other as the free layer magnetization direction 630 rotates in response to the external magnetic field.

The fabrication process for SVT sensor 1100 is the same as the process for SVT sensor 800 described above with reference to FIGS. 8 and 9 but with the positions of the free layer and the NMM layer interchanged. The circuitry described above with reference to FIG. 10 for operation of SVT sensor 800 may be used for SVT sensor 1100.

Advantages of the SVT sensor of the present invention are expected to include an improved magnetoresistance coefficient and an increased signal-to-noise (SNR) ratio. Estimates of the expected characteristics may be obtained from the following analysis. For an SVT having a single ferromagnetic base layer, the transport equations are:

$$I_{c,p} = I_e \cdot T_{SI}\left(a \cdot e^{\frac{-t}{\lambda\uparrow}} + (1-a) \cdot e^{\frac{-t}{\lambda\downarrow}}\right) \text{ and} \quad (1)$$

$$I_{c,ap} = I_e \cdot T_{SI}\left((1-a) \cdot e^{\frac{-t}{\lambda\uparrow}} + a \cdot e^{\frac{-t}{\lambda\downarrow}}\right), \quad (2)$$

where $I_{c,p}$ is the collector current for parallel magnetizations and $I_{c,ap}$ is the collector current for antiparallel magnetizations of the pinned and free layers, $I_e$ is the emitter current, $T_{SI}$ is a spin independent transport factor, α is the fraction of majority (spinup or spindown) electrons injected from the emitter, $\lambda\uparrow$ and $\lambda\downarrow$ are the mean free paths of spinup and spindown electrons, respectively, and t is the thickness of the ferromagnetic base layer. For no nonmagnetic base layer, $T_{SI}$ is of order 0.5 and will depend on the quality of the interfaces, the emitter and collector barrier heights and the mean free path in the collector barrier layer and may be optimized accordingly. For ferromagnetic metals such as Co, Fe and NiFe, α is of order 0.75.

Figure 12:
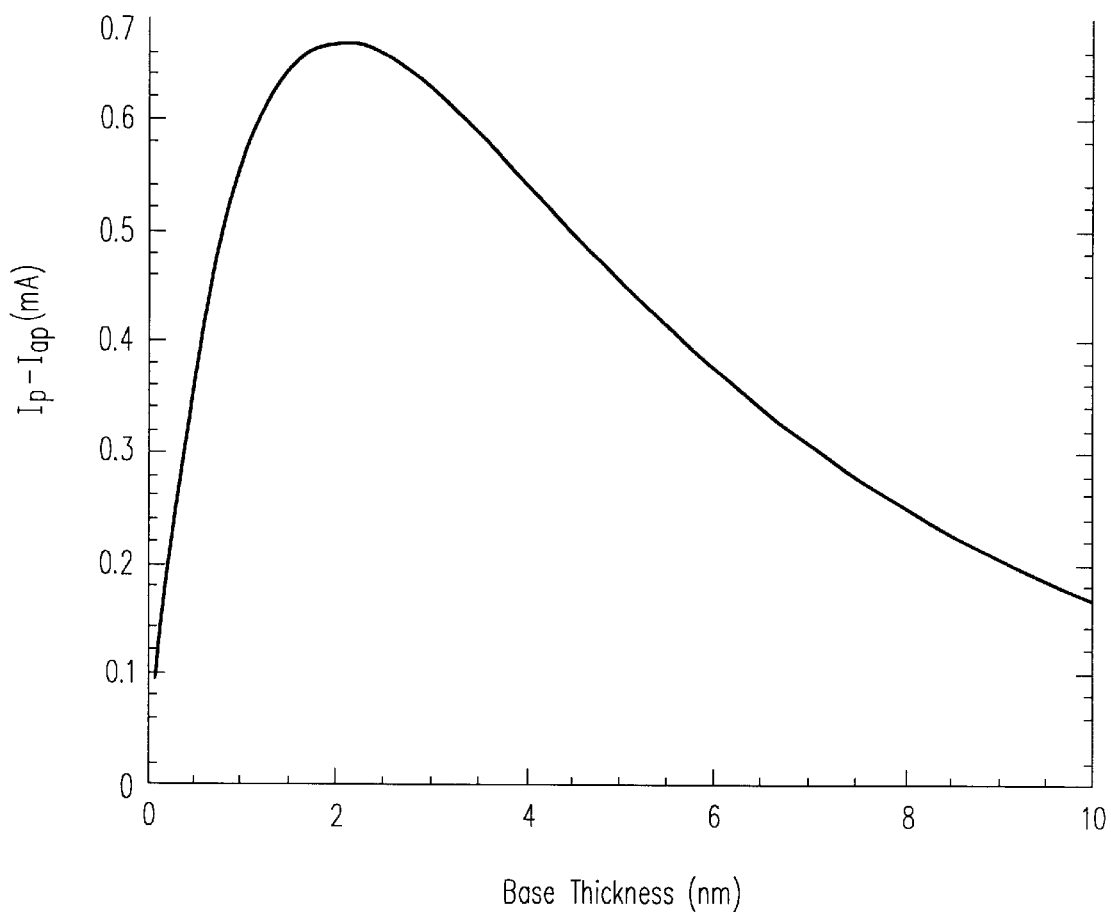
FIG. 12 is a graph of collector current difference ($\Delta I_c$) versus ferromagnetic base layer thickness for a spin valve transistor.

FIG. 12 is a graph plotting the collector current difference $\Delta I_c = I_{c,p} - I_{c,ap}$ obtained from Equations (1) and (2) as a function of the ferromagnetic base layer thickness t. The collector current difference $\Delta I_c$ was calculated using $T_{SI}$=0.5, α=0.75, emitter current $I_e$=5 mA, and mean free paths $\lambda\uparrow$ and $\lambda\downarrow$ in NiFe of 5 nm and 1 nm, respectively. From FIG. 12 it is seen that a base layer thickness of about 2 nm (20 Å) results in a maximum for $\Delta I_c$=0.67 mA. The relative change in collector current $\Delta I_c/I_{c,ap}$ may be calculated using Equations (1) and (2) and results in $\Delta I_c/I_{c,ap}$=99% for the values of parameters given above. The absolute values of the currents from Equations (1) and (2) are $I_{c,p}$=1.34 ma and $I_{c,ap}$=0.67 ma, respectively.

The signal-to-noise ratio (SNR) of the spin valve transistor (SVT) is:

$$SNR = 20\, log I_{c,p} - \frac{I_{c,ap}}{I_n} \quad (3)$$

Where $I_n$ is the noise current. The SNR of the SVT is collector current shot noise limited. The shot noise is $I_n=\sqrt{(2qI_c df)}$, where q is the electron charge, Iis the collector signal current and df is the bandwidth. Assuming df=100 MHz and taking $I_c \sim \Delta I_c$=0.67 mA, the collector noise current $I_n$=147 nA. The SNR from Equation (3) is then 73.2 dB which is a very good value.

Another advantage of the SVT sensor of the present invention over MTJ sensors is that the SVT sensor can operate at a higher bias voltage than the MTJ sensor with a resultant large change in collector current. In general, the tunnel magnetoresistance of an MTJ sensor decreases with increasing applied bias. The magnetoresistance can typically decrease from 30% at an applied bias of 10 mV to about 15% at a bias of 500 mV. In contrast, the SVT sensor can be operated at high emitter bias (1–1.5 volts) without degradation of change in the collector current. At high applied bias non-linearity of the emitter tunnel junction i–v characteristic makes the impedance very low resulting in lower impedance of the tunnel junction for the SVT sensor.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

We claim:

1. A magnetic read/write head, comprising:
   a write head including:
      at least one coil layer and an insulation stack, the coil layer being embedded in the insulation stack;
      first and second pole piece layers connected at a back gap and having pole tips with edges forming a portion of an air bearing surface (ABS);
      the insulation stack being sandwiched between the first and second pole piece layers; and
      a write gap layer sandwiched between the pole tips of the first and second pole piece layers and forming a portion of the ABS;
   a read head including:
      a spin valve transistor sensor, first and second shield layers and a common electrode, the spin valve transistor sensor being sandwiched between the first and second shield layers, the spin valve transistor sensor including:
         an emitter element comprising a ferromagnetic pinned layer, and a first tunnel barrier layer;
         a collector element; and
         a base element comprising a ferromagnetic free layer disposed between said collector element and the first tunnel barrier layer of said emitter element, a back edge of said base element connected to the common electrode; and
      an insulation layer disposed between the second shield layer of the read head and the first pole piece layer of the write head.

2. The magnetic read/write head as recited in claim 1 wherein the collector element comprises:
   a nonmagnetic metal layer; and
   a second tunnel barrier layer disposed between the nonmagnetic metal layer and the ferromagnetic free layer.

3. The magnetic read/write head as recited in claim 2 wherein the emitter element includes an antiferromagnetic layer for pinning the direction of the magnetization of the ferromagnetic pinned layer, said pinned layer being located between the first tunnel barrier layer and the antiferromagnetic layer.

4. The magnetic read/write head as recited in claim 3 wherein the antiferromagnetic layer is selected from a group of materials consisting of iridium manganese (Ir—Mn), platinum manganese (Pt—Mn), platinum palladium manganese (Pt—Pd—Mn) and nickel manganese (Ni—Mn).

5. The magnetic read/write head as recited in claim 3 wherein the ferromagnetic pinned layer is cobalt iron (Co—Fe).

6. The magnetic read/write head as recited in claim 3 wherein the ferromagnetic pinned layer comprises a sublayer of nickel iron (Ni—Fe) and an interface layer of cobalt (Co), said interface layer being located between the sublayer of Ni—Fe and the first tunnel barrier layer.

7. The magnetic read/write head as recited in claim 3 wherein the first tunnel barrier layer is aluminum oxide ($Al_2O_3$).

8. The magnetic read/write head as recited in claim 7 wherein the first tunnel barrier layer has a thickness in the range of 5–15 Å.

9. The magnetic read/write head as recited in claim 3 wherein the second tunnel barrier layer is aluminum oxide ($Al_2O_3$).

10. The magnetic read/write head as recited in claim 9 wherein the second tunnel barrier layer has a thickness in the range of 5–25 Å.

11. The magnetic read/write head as recited in claim 3 wherein the second tunnel barrier layer is selected from a group of materials consisting of aluminum oxide ($Al_2O_3$), aluminum nitride (AlN), boron nitride (BN), titanium oxide ($TiO_2$) and zinc oxide (ZnO).

12. The magnetic read/write head as recited in claim 3 wherein the ferromagnetic free layer is selected from a group of materials consisting of cobalt (Co), iron (Fe), cobalt iron (Co—Fe) and nickel iron (Ni—Fe).

13. The magnetic read/write head as recited in claim 3 wherein the nonmagnetic metal layer is platinum (Pt).

14. The magnetic read/write head as recited in claim 3 wherein the nonmagnetic metal layer is selected from a group of materials consisting of platinum (Pt), gold (Au), aluminum (Al), copper (Cu) and silver (Ag).

15. The magnetic read/write head as recited in claim 3 wherein the ferromagnetic free layer has a thickness in the range of 5–100 Å.

16. The magnetic read/write head as recited in claim 3 wherein the second tunnel barrier layer is a semiconductor material having a bandgap in the range of 0.6–3.0 eV.

17. A magnetic read/write head, comprising:
   a write head including:
      at least one coil layer and an insulation stack, the coil layer being embedded in the insulation stack;
      first and second pole piece layers connected at a back gap and having pole tips with edges forming a portion of an air bearing surface (ABS);
      the insulation stack being sandwiched between the first and second pole piece layers; and
      a write gap layer sandwiched between the pole tips of the first and second pole piece layers and forming a portion of the ABS;

a read head including:
- a spin valve transistor sensor, first and second shield layers and a common electrode, the spin valve transistor sensor being sandwiched between the first and second shield layers, the spin valve transistor sensor including:
  - an emitter element including an antiferromagnetic layer, a first tunnel barrier layer and a ferromagnetic pinned layer, said ferromagnetic pinned layer located between the antiferromagnetic layer and the first tunnel barrier layer;
  - a collector element including a second tunnel barrier layer and a ferromagnetic free layer adjacent to said second tunnel barrier layer; and
  - a base element disposed between said emitter element and said collector element, a back edge of the base element connected to the common electrode, said base element being a nonmagnetic metal layer located between the first and second tunnel barrier layers; and
- an insulation layer disposed between the second shield layer of the read head and the first pole piece layer of the write head.

18. The magnetic read/write head as recited in claim 17 wherein the ferromagnetic free layer is selected from a group of materials consisting of cobalt (Co), iron (Fe), cobalt iron (Co—Fe) and nickel iron (Ni—Fe).

19. The magnetic read/write head as recited in claim 17 wherein the nonmagnetic metal layer is platinum (Pt).

20. The magnetic read/write head as recited in claim 17 wherein the nonmagnetic metal layer is selected from a group of materials consisting of platinum (Pt), gold (Au), aluminum (Al), copper (Cu) and silver (Ag).

21. The magnetic read/write head as recited in claim 17 wherein the nonmagnetic metal layer has a thickness in the range of 5–100 Å.

22. A disk drive system comprising:
- a magnetic recording disk;
- a magnetic read/write head for magnetically recording data on the magnetic recording disk and for sensing magnetically recorded data on the magnetic recording disk, said magnetic read/write head comprising:
  - a write head including:
    - at least one coil layer and an insulation stack, the coil layer being embedded in the insulation stack;
    - first and second pole piece layers connected at a back gap and having pole tips with edges forming a portion of an air bearing surface (ABS);
    - the insulation stack being sandwiched between the first and second pole piece layers; and
    - a write gap layer sandwiched between the pole tips of the first and second pole piece layers and forming a portion of the ABS;
  - a read head including:
    - a spin valve transistor sensor, first and second shield layers and a common electrode, the spin valve transistor sensor being sandwiched between the first and second shield layers, the spin valve transistor sensor including:
      - an emitter element including an antiferromagnetic layer, a first tunnel barrier layer and a ferromagnetic pinned layer, said ferromagnetic pinned layer located between the antiferromagnetic layer and the first tunnel barrier layer;
      - a collector element; and
      - a base element comprising a free ferromagnetic layer disposed between said collector element and the first tunnel barrier layer of said emitter element, a back edge of said base element connected to the common electrode; and
- an insulation layer disposed between the second shield layer of the read head and the first pole piece layer of the write head;
- an actuator for moving said magnetic read/write head across the magnetic disk so that the read/write head may access different regions of the magnetic recording disk; and
- a recording channel coupled electrically to the write head for magnetically recording data on the magnetic recording disk and to the spin valve transistor sensor of the read head for detecting changes in resistance of the spin valve transistor sensor caused by rotation of the magnetization axis of the ferromagnetic free layer relative to the fixed magnetizations of the ferromagnetic layer in response to magnetic fields from the magnetically recorded data.

23. The disk drive system as recited in claim 22 wherein the collector element comprises:
- a nonmagnetic metal layer; and
- a second tunnel barrier layer disposed between the nonmagnetic metal layer and the ferromagnetic free layer.

* * * * *